United States Patent [19]
Borrino et al.

[11] Patent Number: 5,490,679
[45] Date of Patent: Feb. 13, 1996

[54] SEAL RING DESIGN

[75] Inventors: Thomas Borrino, Glendale Heights; Mark E. Kraft, Berwyn, both of Ill.

[73] Assignee: John Crane Inc., Morton Grove, Ill.

[21] Appl. No.: 170,524

[22] Filed: Dec. 20, 1993

[51] Int. Cl.[6] .................................................. F16J 15/16
[52] U.S. Cl. ............................................ 277/65; 277/96.1
[58] Field of Search ........................... 277/69, 96, 96.1, 277/27, 81 R, 38

[56] References Cited

U.S. PATENT DOCUMENTS

| | | | |
|---|---|---|---|
| 3,499,653 | 3/1970 | Gardner . | |
| 3,751,045 | 8/1973 | Lindeboom | 277/96.1 |
| 4,026,564 | 5/1977 | Metcalf | 271/96.1 |
| 4,212,475 | 7/1980 | Sedy | 277/96.1 |
| 4,335,888 | 6/1982 | Ohba et al. | 277/96.1 |
| 4,377,290 | 3/1983 | Netzel | 277/65 |
| 4,721,311 | 1/1988 | Kakabaker | 277/22 |
| 4,722,534 | 2/1988 | Wentworth . | |
| 5,143,384 | 9/1992 | Lipschitz | 277/27 |
| 5,203,575 | 4/1993 | Azibert et al. | 277/65 |
| 5,217,233 | 6/1993 | Pecht et al. | 277/65 |

FOREIGN PATENT DOCUMENTS

| | | | |
|---|---|---|---|
| 1643834 | 4/1991 | U.S.S.R. | 277/96.1 |
| 9222760 | 12/1992 | WIPO | 277/96.1 |

OTHER PUBLICATIONS

E. Mayer, Mechanical Seals, pp. 176–179, no date available.

*Primary Examiner*—Daniel G. DePumpo
*Attorney, Agent, or Firm*—Dorn, McEachran, Jambor & Keating

[57] ABSTRACT

A mechanical end face seal having a first seal ring with a generally radially extending sealing face, a second seal ring having a sealing face opposite to and in mating relation with the sealing face of the first seal ring, the second seal ring having a generally radially extending back face removed from and oppositely disposed to said sealing face, the back face including an annular shoulder at the outer diameter defined by an annular axially extending flange which forms an annular section between the flange and the ring outer diameter. The annular section displaces the ring centroid further toward the seal interface and also toward the ring inner diameter, thus minimizing axial rotational and pressure forces acting on the axially movable ring to stabilize the ring. Stabilization of the ring permits balancing the seal to over 80% for dry-running with a gas lubricant at over 300 psig pressure differential and high rotational speeds. A second seal may be used having a second primary ring within a similar shoulder to provide a similar effect, the second seal together with the first seal defining a buffer chamber between them.

20 Claims, 1 Drawing Sheet

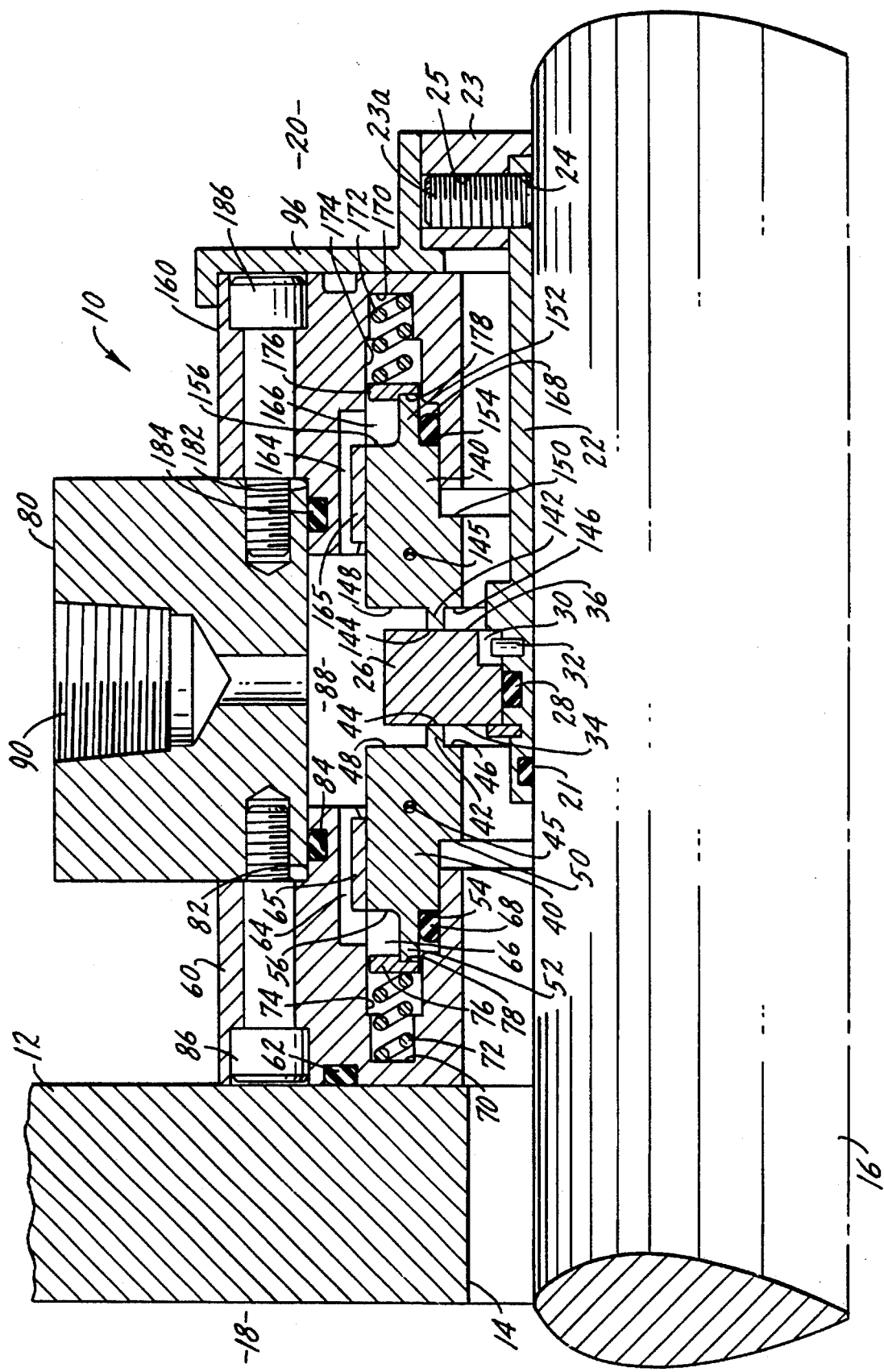

SEAL RING DESIGN

BACKGROUND OF THE INVENTION

1. Field of the Invention

The present invention relates generally to seals of the mechanical end face type and more particularly relates to contacting type end face seals for sealing mixers and other heavy duty uses.

2. Background Art

Mixers and agitators and other heavy duty uses of seals have been known to present a great amount of stress on the elements comprising the seals, especially the seal faces and seal rings. Wet running seals have been proposed which provide a buffer fluid between the seal faces of both an inboard and an outboard seal. Examples of such a seal are found in U.S. Pat. No. 4,721,311 issued to Kakabaker. Dry running seals, that is seals which have gas as a buffer fluid, are known, including those for pumping gas downstream from the high pressure side or the process fluid side toward the buffer chamber or a lower pressure side. An example of such a seal is found in U.S. Pat. No. 5,217,233, issued to Pecht et al, and commonly assigned to the assignee of the present invention.

Dry running gas seals are also known which have a dual seal arrangement in which the primary rings are rotating with the shaft and the stationary mating ring is sealingly connected to the housing. Dry running gas seals utilize gas as the sealed fluid.

For gas seals which do not have plural spiral grooves in the face of one of the seal rings, a fluid gap may be formed by introducing a pressurized gas between the seal faces during shaft rotation. However, because gas is compressible, differences in pressure are encountered across the radial profile of the seal face. The amount of pressure developed at a particular radial position necessarily depends on a number of factors. However, the compressibility of gases changes the forces which act to open a gap between the seal faces, and this change in forces may upset the delicate balance in the forces acting to keep the gap at a minimum distance to avoid fluid leakage while simultaneously avoiding high wear at the seal faces.

SUMMARY OF THE INVENTION

Accordingly, what is disclosed herein is a mechanical end face seal for providing fluid tight sealing between a housing containing a fluid and a shaft extending through an aperture in the housing, the shaft rotating relative to the housing, the seal comprising a first seal ring having a generally radially extending sealing face, a second seal ring having a generally radially extending sealing face shaped and dimensioned to be in opposite mating relationship to the sealing face of the first seal ring, the portions of the second ring sealing face which sealingly engage the first ring sealing face defining a seal interface, one of the first or second seal rings being disposed coaxially with the shaft and being nonrotatably connected with and sealed against the housing, and the other of the rings being sealed to and connected coaxially with the shaft to rotate therewith, one of the rings being inserted within a retaining element and being movable axially, relative to the retaining element, and a biasing means adapted to urge the axially movable ring toward the other ring to bring the sealing faces close to each other to provide a rotatable sealing engagement relative to one another, the axially movable seal ring further comprising a radially extending back face, removed from and oppositely disposed from the sealing face of the axially movable seal ring, the back face including a shoulder disposed adjacent the outer diameter portion of the axially movable seal ring, the shoulder at least partially defining a protruding flange extending axially from the seal ring back face and an annular section extending radially between a flange outer diameter and the retaining element, the seal interface and the inner diameter surface of the axially movable seal ring.

BRIEF DESCRIPTION OF THE DRAWING

The figure illustrates in a cross-sectional view a dual seal arrangement according to the present invention.

DETAILED DESCRIPTION OF THE PREFERRED EMBODIMENT

The figure shows a double opposed balanced seal arrangement 10 according to the present invention. The seal arrangement 10 seals between a stationary housing 12 having an aperture 14 and a relatively rotating shaft 16 which extends through the aperture 14. Seal arrangement 10 consists of a number of stationary parts and a number of relatively rotating parts which rotate with the shaft 16. The housing seals a process fluid which is contained in the space 18 enclosed by the housing 12, from leaking into the environment outside the seal system, generally designated as 20.

The term "double opposed" refers to two separate seals having common elements which face in opposite relative directions and each seal may be a mirror image of the other. Although the preferred embodiment shows the two seals sharing a common mating ring, two separate mating rings, one for each seal, may be used.

The seal system 10 further comprises a shaft sleeve 22 which is sealed to the shaft by means of an O-ring 21. The shaft sleeve 22 comprises a cylindrical tube which can be slipped over the shaft 16 together with other elements of the seal system assembly in an integral cartridge unit for easy installation. An aperture 24 is available at the atmosphere side of the sleeve 22 to inhibit displacement in the rotational or axial directions. A drive collar 23, having radially extending threaded bores 25, fits over the shaft 16 and also partly over the sleeve 22. The threaded bores 25 line up over the aperture 24 to receive a set screw 23A that attaches the drive collar 23 and shaft sleeve 22 to the shaft 16.

The shaft sleeve 22 supports a mating ring 26 which is sealingly attached to the shaft sleeve 22 for rotation with the sleeve 22 and shaft 16. An O-ring 28 seals the mating ring 26 to the shaft sleeve 22, and the mating ring 26 preferably includes one or more indents 30 into which drive pins 32 are disposed. The drive pins 32 which extend from an aperture in the shaft sleeve 22 engage the indents 30 to drive the mating ring 26 so that it rotates together with the shaft 16 and shaft sleeve 22.

Preferably, the mating ring 26 further comprises two radially extending sealing faces 34,36 disposed on opposite sides of the ring 26. Alternatively, two separate primary rings (not shown) may each provide a radially extending sealing face for each of the two seals comprising the seal system. Each sealing face 34,36 comprises a very flat, essentially co-planar surface which can bear a corresponding sealing face of an oppositely facing primary ring.

Primary rings 40,140 are each oppositely disposed on either side of the mating ring 26. In most respects, the primary rings 40,140 are essentially identical to each other albeit one ring is disposed facing in the opposite direction from that of the other ring. Similarly, the apparatus supporting each ring 40,140 is also essentially identical and those elements are facing in the opposite directions, so that the primary ring and elements forming the inboard seal are a mirror image, from the primary ring and elements forming the outboard seal. Accordingly, similar or identical elements forming each seal will thus be referenced using similar reference numerals, differing from each other by 100 digits.

A radially disposed sealing face 44 on primary ring 40 together with the sealing face 34 comprise an inboard or upstream seal, and similarly disposed, radially extending sealing face 144 on primary ring 140 together with sealing face 36 provides an outboard or downstream seal. Each of the primary ring sealing faces 44,144 are disposed on the end of an annular protuberance or ridge, referred to herein as a wear nose 42,142. The wear noses 42,142 extend from the main body mass of each ring 40,140, respectively, so that an annular elongated gap is formed between ring 26 and each of rings 40,140, respectively, on either radial side of the wear noses 42,142. The gaps are bounded by an annular portions 46,146 of the seal rings 40,140 disposed radially inwardly of the wear noses 42,142 and second annular portions 48,148 of seal rings 40,140 disposed radially outwardly of the wear noses 42,142.

Primary rings 40,140 are also shaped and dimensioned to provide inventive features which are not disclosed elsewhere and which permit greater operational effectiveness of the inventive seal system. For example, the force opening/force closing ratio, which is dependent on a number of structural and operational factors, and these factors are taken into account in the fabrication and design of the seal parameters. The seal element parameters and operating factors are chosen to produce opening and closing forces which operate on the seal rings 40,140, and are balanced under a variety of seal operating conditions. The primary seal rings 40,140 continue to be biased against the mating ring faces 34,36 respectively, regardless of transitory pressure differences which sometimes result during normal seal system operation.

Generally, each primary ring of a seal has a centroid 45,145, as shown in the primary rings 40,140. The centroid of a seal ring is defined as the point, in a cross-section of the ring, about which the annular ring deflects, to a very limited degree, due to forces that act upon different parts of the ring. In reality, the centroid follows a circular line which extends through the ring body which can be thought of as a "center of gravity" of small sections of the ring.

Using ring 40 as an example, the pressure of the process fluid contained within the space 18 of housing 12 produces a closing force on an annular portion 50 of the ring 40 at a radially extending face located opposite the seal ring 40 from the sealing face 44. The configuration of the radially extending seal face 44 provides an annular portion 46 on the ring 40 which is adjacent the wear nose 42. The annular portions 46 and 50 are approximately at the same radius from the centerline of the seal body and are of approximately equal surface area. Both annular portions 46,50 are exposed to the process fluid pressure and the process fluid exerts an essentially equal but opposite pressure force on each portion 46,50 of the ring 40. Thus, the pressure forces acting on portions 46,50 tend to cancel each other out in the axial direction relative to the centroid 45.

A similar phenomenon occurs at the annular portions 146,150 with regard to the pressure provided by the ambient environment located at 20 which exerts forces on the ring 140. The pressure of the ambient environment, which may be atmospheric pressure, also tends to cancel out as the forces acting on ring 140 are equal and opposite relative to the centroid 145.

The back faces of each ring 40,140, which are disposed on the opposite side of the respective ring from the sealing face 44,144, include features which tend to balance the angular forces acting about the centroids 45,145 of the rings 40,140, respectively. The rings 40,140 each include a protruding flange 52,152 as the back face. Each protruding flange 52,152 is disposed extending from the back face at a slightly larger radius than is the respective wear nose 42,142 disposed on the sealing face. First back face annular wall portions 54,154 each extend radially inwardly from the protruding flanges 52,152 and together with the inner diameter surface of the flanges 52,152 provide a shoulder with which sealing O-rings 68,168 are disposed. A bias is provided through the flanges 52,152 to each of the rings 40,140 so that the respective pairs of sealing faces 44,34 and 144,36 maintain contact.

Second back face annular wall portions 56,156 extend radially outwardly from the protruding flanges 52,152 and together with the outer diameter surface of the flanges 52,152 of each of the rings 40,140 define an annular shoulder. The annular shoulder formed by the second back face annular wall portions 56,156 and the flanges 52,152 provides an annular section, which term is herein used in the technical sense and is defined as the open space between two concentric tubes, pipes or vessels, in this case, the annular open space between the flange and a retainer 60,160 within which the seal ring is inserted.

The dimensions of the annular shoulders of the rings 40,140 are configured to provide the optimum force configuration for the respective rings 40,140. Balance of the rings 40,140 is important to the function of the seal assembly 10 in that the sealing faces of the seal rings are maintained in parallel orientation to each other.

The annular shoulder can be considered as a portion of the seal ring which has been omitted or removed to form the annular section. Omitting the ring portion and providing the annular section changes the weight and thermal expansion characteristics of the rings and provides ring stability by minimizing the forces acting on the ring, which forces may detract from its sealing efficiency. Minimization of those forces permits the balance of the seal to be 0.80 or greater. Ring balance is defined in accordance with the definition set forth in U.S. Pat. No. 4,212,475, which patent is also assigned to the assignee of the present invention. Seal ring stability and balance of 0.80 or greater provides the capability of maintaining sealing face contact through a variety of transitory conditions such as changes in pressure differentials across the seals.

It has been found that the relative position of the centroids 45,145 may be manipulated to a limited degree by changing the amount and configuration of the "removed" or "omitted" ring portions which form the annular sections. Manipulation of the centroid position allows a certain amount of control over the pressure and thermal movements which the rings 40,140 undergo during use. The missing or "omitted" portion of the primary rings 40,140 changes the axial and radial position of the respective centroids 45,145. Axially, the centroid position is shifted closer to the sealing faces 44,144 or the seal interface.

The annular section of each ring changes the radius at which the ring centroids 45,145 are disposed. Preferably, the centroid is at a radius that is approximately equal to radius of the protruding flanges 52,152. Thus, any axial biasing force which impinges on the protruding flanges 52,152 necessarily acts at the same radial position on the rings through the centroids 45,145. Thus, the ring is axially biased in a manner that minimizes forces about the centroids 45,145 and minimizes any deformations of the rings 40,140 which may be caused by the axial biasing forces.

To obtain the balance required for the seal ring to operate according to this invention, specific dimensional parameters of the primary ring have been developed. For the axially movable primary rings 40,140, the back face annular section defined by the shoulder remains essentially consistent and is not dependent on the size of the ring. The primary rings 40,140 preferably have a maximum radial width of less than ¾". Radial width is defined as the width taken along a radius from one point to another. The maximum radial width of the primary rings 40,140 is the width between the inner diameter surface, closest to the shaft 16, and the outer diameter surface, adjacent the outer diameter of the retainer cavity 66,166. Preferably, the annular section has a radial width less than one-half of the maximum radial width of the primary ring, and is preferably about ¼" between the outer diameter surface of the flange 52,152 and the outer diameter surface of the primary ring 40,140. The axial width of the annular section is approximately equal or slightly greater than the radial width.

The preferable dimensions of the projecting wear noses 42,142 which end in the sealing faces 44,144 is approximately less than one-eighth inch (⅛") along the radial width direction, and projects from the main body of the rings 40,140 for approximately the same dimension along the axial direction. The short radial width of the sealing face provides for a significant reduction of heat produced by the frictional rubbing of the seal faces as they rotate relative to each other.

Both the protruding wear nose and annular section dimensions described above have been utilized for rings that fit a range of shaft sizes from ¾" to about 8" diameter. Consistent dimensions for these elements regardless of ring size have been found to operate in the manner called for by this invention to provide a seal balance of 0.80 or greater.

The materials used for the primary rings 40,140 are preferably standard for known uses. The primary use for this invention is for a carbon dry-running seal for sealing a gas, in which case a standard carbon ring for gas sealing such as those known as $F_{77}$, available from John Crane Inc. of Morton Grove, Ill., is used.

As discussed above, this seal may also be used in wet running seals for sealing liquids with minor modifications. Although not designed specifically for wet running seals, the seal balance may be retained at 0.80 or greater without detracting from the performance. However, for wet running seals, the preferable material for the primary ring is a carbon graphite known as $F_{72}$, available from John Crane Inc. For either the wet running or dry running seals, the preferred material for the mating ring 26 is tungsten carbide or silicon carbide and the sealing O-rings are elastomeric material, such as a fluoroelastomer or Kalrez, available from E. I. duPont de Nemours and Co.

The inboard seal further comprises the retainer 60 which is sealed to the housing 12 by means of an O-ring 62. The retainer 60 also includes slots 64,164 adapted to fix the rotational position of the primary rings 40,140 by engaging radially extending drive ears 65,165. Thus, the rings 40,140 do not rotate relative to the housing 12 due to torsional forces acting on the sealing faces 44,144 by the mating seal faces 34,36.

The retainer cavity 66 is a U-shaped cross-section with inner and outer diameter walls far enough apart to permit free axial movement of the ring 40 within the cavity 66. An O-ring 68 is disposed in the middle of the inner diameter wall of cavity 66, the protruding flange 52 and the inwardly radially extending rear wall portion 54 so as to seal the primary ring 40 against the inner diameter wall surface of retainer cavity 66. The O-ring 68 is capable of sliding axially through the cavity 66 together with the ring 60 and thus maintain the seal despite relative lateral axial motion.

The retainer cavity 66 further includes a plurality of axially extending bores 70, one of which is shown in cross-section. Bores 70 each contain one of a plurality of biasing springs 72, and the springs 72 extend into an annular projection 74 of the cavity 66. The annular projection 74 is of a sufficient width to retain an annular disc 76. The disc 76 is capable of sliding axially within the annular projection 74. Springs 72 impinge on the disc 76 and provide a continuous bias on the disc 76 tending to push the disc through the annular projection 74.

An annular shoulder 78 on the inner diameter of the disc 76 is disposed on the radially extending wall of disc 76, which is opposite the radially extending wall that is in contact with the spring 72. The shoulder 78 is fabricated in accordance with a precise tolerance so that the protruding flange 52 fits within and abuts shoulder 78 to provide a close tolerance fit between the disc 76 and the primary ring 0. The biasing springs 72 provide a bias on the disc 76 which in turn biases the primary ring 40 into a contacting relationship between primary ring sealing face 44 and mating ring sealing face 34.

Retainer 60 further provides a base upon which the seal system 10 is built. An annular gland plate 80 is disposed about the retainer 60 in a notched shoulder portion 82 thereof. O-ring 84 provides a seal between the gland plate 80 and the retainer 60. A plurality of cap screws connect the retainer 60 and the gland plate 80.

The gland plate 80 surrounds a barrier chamber 88 and an inlet opening 90 provides fluid communication between the barrier chamber 88 and a source of barrier fluid (not shown). The gland plate 80 is connected to housing 12 by bolts (not shown) disposed in bores (not shown) which extend through the gland plate 80. The complete assembly comprising the stationary portions of the seal system 10 are thus fixed to the housing 12.

A second retainer 160 including a notched shoulder 182 provides a support surface for the gland plate 80 at a radially extending surface disposed on an opposite side of gland plate 80. An O-ring 184 seals the retainer 160 to the gland plate 80 and plural cap screws 186 connect the second outboard retainer 160 to the gland plate 80.

The second primary ring 140, as well as other stationary elements associated with the outboard seal, are in most respects identical to the primary ring 40 and associated elements of the inboard seal. The retainer 160 includes a cavity 166 for housing the primary ring 140 and a plurality of bores 170 for insertion of springs 172. An annular projection 174 of the cavity 166 permits axial movement of a disc 176 which through the action of springs 172 axially biases the primary ring protruding flange 152. The axial bias of the primary ring 140 forces the sealing face of the primary ring 140 into contact and sealing relation against the mating ring sealing face 36. The other elements, for example, O-ring 168, all are essentially identical, but in mirror image positions, as are the stationary elements of the inboard seal.

The outboard seal as shown in the figure includes a temporary spacer 96 which during assembly is inserted between the drive collar 23 and the retainer 160. The axial position of the drive collar 23 is fixed relative to that of the mating ring 26. Thus, insertion of the spacer 96 fixes the position of mating ring 26 within the space between the inboard and outboard seals during installation. The seal system 10 is intended for use in mixers, agitators and other heavy duty uses where transient but severe displacements in both axial and radial directions are to be expected. The inventive seal system is capable of withstanding such displacements because the position of the drive collar 23, the shaft sleeve 22 and the mating ring 26 are all fixed relative to the shaft 16 when the shaft is at an equilibrium position relative to a displaced position which occurs during seal operation. Thus, axial movement of the shaft 16 can be accommodated by simultaneous axial displacement of both primary rings 40,140, and the ability for axial movement within the cavities 66,166 is determined by the distance of the O-rings 68,168 from the respective ends of the cavities 66,166.

The spacer 96 effectively centers the mating ring within the seal system 10 so that the load is equal on each of the springs 72,172. The spacer 96 is removed after completion of the installation of the seal system, as it is not necessary during seal operation.

During normal operation of the inventive seal system, the seals preferably operate as either dry running contact seals or as wet running seals. A relatively inert barrier fluid, such as nitrogen gas, is introduced into the barrier chamber 88. Preferably, the pressure of the barrier fluid within the barrier chamber 88 is somewhat higher than the pressure of either the process fluid in the space 18 or of the ambient environment at space 20. The higher barrier fluid pressure tends to force the sealing faces 44,34 and 144,36 together, but the seal construction, i.e. the 0.80 or greater sealing balance, retains faces in contact even if the barrier fluid pressure falls below the pressure of the process fluid or even of the atmosphere.

The spring load and compression rate of springs 72,172 can be customized to match the sealing face width, the O-ring drag and primary ring mass so as to provide optimal performance of seal systems. Moreover, the flatness of the faces is very precise, tending toward an optical flatness, so that a static seal is provided by the seal faces when the shaft is not rotating.

A dry running seal which uses a dry gas, such as nitrogen, as a barrier fluid operates differently from a seal in which a liquid film is present between the seal faces. Gases are compressible, whereas liquids are not. Incompressible liquids have a linear rate of pressure decay across an ideal seal interface. The compressibility of gas changes the pressure profile of the barrier fluid pressure across a seal interface. Non-linear pressure decay of gases across a seal interface changes the intensity and position of the forces acting on the rings, because the force applied by pressure at the seal interface reacts differently from what would be expected in a linear pressure decay regime. For example, a gas which undergoes pressurization at a local area of the seal face increases the stiffness of the gas as the ring faces approach each other. Thus, the different pressure characteristics and decreased localized fluid pressure must be taken into account when balancing the forces presented by the pressure of the gas film, otherwise the balance of the seal rings will be upset at the high pressures and rotational speeds which are present in devices for which the invention is contemplated. It has been found that a structure having seal parameters according to the present invention, and especially of the primary ring shoulder at the outer diameter, provides for an optimal balance of the seals at 80% or greater for seal systems having a pressure differential between the housing chamber and the intermediate buffer chamber of at least 300 psig.

Other modifications may become apparent to a person of ordinary skill in the art once an understanding of the inventive concept described herein is had. Accordingly, this invention is not limited by the illustrated embodiments shown and described herein, but is limited only by the following claims.

What is claimed is:

1. A mechanical end face seal for providing fluid tight sealing between a housing containing a fluid and a shaft extending through an aperture in the housing, the shaft rotating relative to the housing, the seal comprising:

a) a first seal ring having a generally radially extending sealing face;

b) a second seal ring having a generally radially extending sealing face shaped and dimensioned to be in opposite mating relationship to the sealing face of said first seal ring, the portions of said second ring sealing face which sealingly engage said first ring sealing face defining a seal interface, one of said first or second seal rings being disposed coaxially with said shaft and being nonrotatably connected with and sealed against the housing, and the other of the rings being sealed to and connected coaxially with the shaft to rotate therewith, one of said rings being disposed within a retaining element and being movable axially relative to the retaining element; and c) a biasing means adapted to urge the axially movable ring toward the other ring to bring the sealing faces close to each other to provide a rotatable sealing engagement relative to one another, said axially movable seal ring further comprising a radially extending back face, removed from and oppositely disposed from the sealing face of the axially movable seal ring, said back face including a first shoulder disposed adjacent the outer diameter portion of the axially movable seal ring, and a second shoulder disposed on said back face adjacent an inner diameter portion of the axially movable seal ring, said first and second shoulders at least partially defining a protruding annular flange extending axially from the seal ring back face, said protruding annular flange having an outer diameter surface and an inner diameter surface, said flange outer diameter surface partially defining an annular outer section extending between said flange outer diameter surface and said retaining element, said annular outer section having at least an axial dimension and a radial dimension, said flange inner diameter surface at least partially defining said second shoulder, said second shoulder being shaped dimensioned and configured to receive a means for sealing between said flange inner diameter surface and said retaining element within which said axially movable ring is disposed, said annular outer section and said second shoulder being shaped, dimensioned and configured to position the centroid of the axially movable seal ring closer to the seal interface and to the inner diameter surface of the axially movable seal ring.

2. The mechanical face seal according to claim 1 wherein the axially movable seal ring is shaped and dimensioned to provide a seal balance of at least 0.80.

3. The mechanical face seal according to claim 2 wherein said seal of the axially movable seal ring includes a sealing face configuration which is shaped and positioned to produce a seal balance of at least 0.80.

4. The mechanical face seal according to claim 1 wherein the annular section radial dimension is approximately less than one-half of the radial width of the axially movable ring.

5. The mechanical face seal according to claim 3 wherein the axial dimension of said annular section is approximately as large as the radial dimension of said annular section.

6. The mechanical face seal according to claim 1 wherein said sealing face of said axially movable ring is disposed on a protruding annular wear nose having a radial width dimension significantly smaller than the radial width of the axially movable ring.

7. The mechanical face seal according to claim 5 wherein the radial width dimension of the seal face of said axially movable ring is not greater than one-eighth inch (0.32 cm).

8. The mechanical face seal according to claim 1 further comprising a shaft sleeve disposed between said seal and said shaft, said ring coaxially connected to and rotating with the shaft being sealed against said shaft sleeve.

9. A double mechanical end face seal system for providing fluid tight sealing between a housing containing a fluid and a shaft extending through an aperture in the housing and rotating relative thereto, the seal system comprising:

a) an inboard seal including a first seal ring having a generally radially extending sealing face, a second seal ring having a generally radially extending sealing face shaped and dimensioned to be in opposite mating relationship to the sealing face of said first seal ring, one of said first and second seal rings being disposed coaxially with said shaft and being nonrotatably connected with and sealed against the housing, and the other of the rings being sealed to and connected coaxially with the shaft to rotate therewith, one of said rings being inserted within a retaining element and being movable axially relative to the retaining element, and a biasing means adapted to urge the axially movable ring toward the other ring to bring the sealing faces close to each other to provide a rotatable sealing engagement relative to one another, said axially movable seal ring further comprising a radially extending back face, removed from and oppositely disposed from the sealing face of the axially movable seal ring, said back face including a first shoulder disposed adjacent the outer diameter portion of the axially movable seal ring, said axially movable seal ring further comprising a second shoulder disposed on said back face adjacent an inner diameter portion of the axially movable seal ring, said first and second shoulders at least partially defining a protruding annular flange extending axially from the seal ring back face, said protruding annular flange having an outer diameter surface and an inner diameter surface, said flange outer diameter surface partially defining an annular outer section extending between said flange outer diameter surface and said retaining element, said annular outer section having at least an axial dimension and a radial dimension, said flange inner diameter surface at least partially defining said second shoulder, said second shoulder being shaped dimensioned and configured to receive a means for sealing between said flange inner diameter surface and said retaining element within which said axially movable ring is disposed, said annular outer section and said second shoulder being shaped, dimensioned and configured to position the centroid of the axially movable seal ring closer to the seal interface and to the inner diameter surface of the axially movable seal ring;

b) an outboard seal including a first seal ring having a generally radially extending sealing face, a second seal ring having a generally radially extending sealing face shaped and dimensioned to be in opposite mating relationship to the sealing face of said first seal ring, the portions of said second ring sealing face which sealingly engage said first ring sealing face defining a seal interface, one of said first or second seal rings being disposed coaxially with said shaft and being nonrotatably connected with and sealed against the housing, and the other of the rings being sealed to and connected coaxially with the shaft to rotate therewith, one of said rings being inserted within a retaining element and being movable axially relative to the retaining element, and a biasing means adapted to urge the axially movable ring toward the other ring to bring the sealing faces close to each other to provide a rotatable sealing engagement relative to one another, said axially movable seal ring further comprising a radially extending back face, removed from and oppositely disposed from the sealing face of the axially movable seal ring, said back face including a shoulder disposed adjacent the outer diameter portion of the axially movable seal ring, wherein the shoulder at least partially defines a protruding flange extending axially from the seal ring back face and an annular section extending between a flange outer diameter and said retaining element, the annular section providing a position of the centroid of the axially movable seal ring closer to the seal interface and to the inner diameter surface of the axially movable seal ring; and c) an annular buffer fluid chamber disposed between said inboard and outboard seals.

10. The double mechanical end face seal system according to claim 9 wherein said inboard and said outboard seals comprise a common axially non-movable seal ring and the axially non-movable radially extending sealing face of the inboard seal is disposed on one side of said ring and the non-movable, radially extending sealing face of the outboard seal is disposed on the opposite side of said ring.

11. The double mechanical face seal according to claim 9 wherein said axially movable ring of each seal is shaped and dimensioned to provide a seal balance of at least 0.80.

12. The double mechanical face seal according to claim 11 wherein said axially movable rings of each said inboard and outboard seals include sealing faces which are shaped and positioned to provide a seal balance to each seal of at least 0.80.

13. The double mechanical face seal according to claim 9 wherein the annular section of each said axially movable ring has a radial dimension which is approximately less than one-half of the radial width of the axially movable ring.

14. The double mechanical face seal according to claim 13 wherein the axial dimension of said annular section of each said axially movable ring is approximately as large as the radial dimension of said annular section of each said axially movable ring.

15. The double mechanical face seal according to claim 9 wherein said sealing face of each said axially movable ring is disposed on a protruding annular wear nose having a radial width dimension significantly smaller than the radial width of the axially movable ring.

16. The double mechanical face seal according to claim 15, wherein the radial width dimension of each axially movable ring seal face is not greater than one-eighth inch (0.32 cm).

17. The double mechanical face seal according to claim 9 further comprising a shaft sleeve disposed between at least one of said seals and said shaft, each said axially non-movable ring being coaxially connected to and rotating with the shaft being sealed against said shaft sleeve.

18. The double mechanical face seal according to claim 10 wherein said axially non-movable seal ring is connected to and sealed against the shaft and rotating therewith.

19. The mechanical face seal according to claim 6 wherein said protruding annular flange is positioned configured to a radius approximately equal to the centroid of said axially movable ring.

20. The mechanical face seal according to claim 15 wherein said protruding annular flange is positioned configured to a radius approximately equal to the centroid of said axially movable ring.

\* \* \* \* \*